United States Patent [19]

Stenkvist

[11] 4,425,659

[45] Jan. 10, 1984

[54] METAL OXIDE REDUCTION FURNACE

[75] Inventor: Sven-Einar Stenkvist, Västerås, Sweden

[73] Assignee: ASEA AB, Västerås, Sweden

[21] Appl. No.: 293,708

[22] Filed: Aug. 18, 1981

[30] Foreign Application Priority Data

Sep. 17, 1980 [SE] Sweden .............................. 8006522

[51] Int. Cl.³ .............................................. H05B 7/00
[52] U.S. Cl. ...................................... 373/108; 373/24
[58] Field of Search ................. 373/1, 2, 60, 61, 107, 373/108, 18, 22, 24; 75/10 R

[56] References Cited

U.S. PATENT DOCUMENTS

| | | | |
|---|---|---|---|
| 1,587,197 | 6/1926 | Southgate | 373/2 |
| 1,904,683 | 4/1933 | Greene | 373/2 |
| 4,110,546 | 8/1978 | Stenkvist | 373/107 X |
| 4,149,024 | 4/1979 | Stenkvist et al. | 373/107 |
| 4,334,917 | 6/1982 | Kibby | 75/10 R |

*Primary Examiner*—Roy N. Envall, Jr.
*Attorney, Agent, or Firm*—Kenyon & Kenyon

[57] ABSTRACT

A metal oxide reduction furnace has a shaft holding a verticle column of coke. An electric arc on the side of the lower portion of the column burns a cavity in the coke column and the arc is surrounded by the side wall and inner closed end of the cavity so that high temperatures are obtained. A stream of the metal oxide in particulated form mixed with a reducing agent is projected into the cavity to react endothermically within the cavity and lower the high temperature while reducing the oxide to its metal.

4 Claims, 1 Drawing Figure

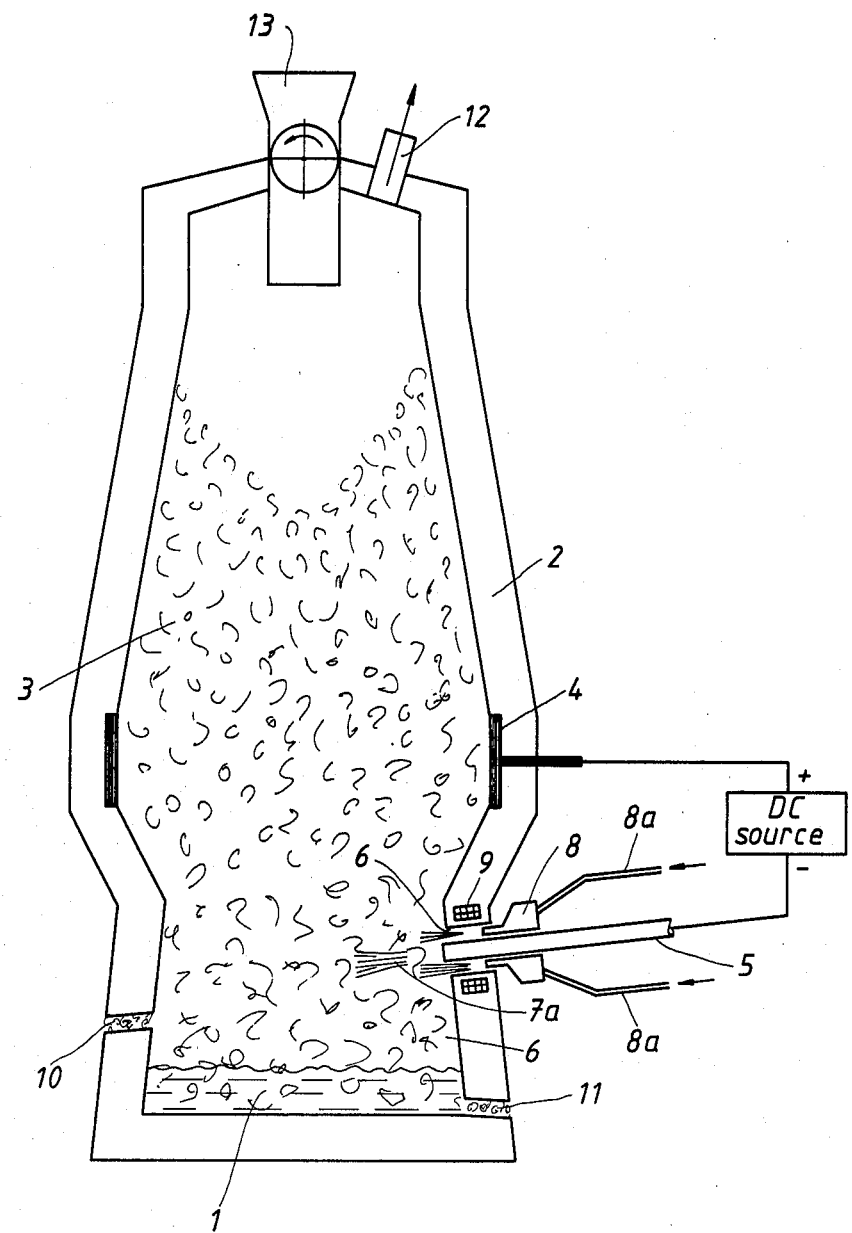

METAL OXIDE REDUCTION FURNACE

BACKGROUND OF THE INVENTION

Iron ore can be reduced by feeding the ore in powdered form together with a powdered solid or liquid carbonacous reducing agent, into a reaction zone maintained at a temperature high enough to cause a substantial instantaneous reaction between the oxide and agent. The reaction is endothermic and requires a continuous supply of heat.

One proposal has been to use a shaft furnace charged with a coke column. To supply the necessary heat it was thought that a plasma burner might be installed in the furnace side above the hearth to provide the reaction zone in the coke. This proposal was never reduced to practice insofar as is known.

On the other hand, melt reduction is a practical process. It comprises the use of a DC arc furnace in which a carbonacous iron melt is maintained and into which the ore and agent are fed at the foot of the arc.

SUMMARY OF THE INVENTION

The iron ore reduction furnace of the present invention is in the form of a shaft furnace, it having a hearth and a shaft extending upwardly from the hearth and adapted to contain a high coke column above the hearth but no tyre as such is used. Thermal energy is provided by contact means connecting electric power to the coke column, and an electric arcing electrode extending transversely through a side of the shaft above the hearth and which is connected with the power so as to form arc with the side of the coke column and burn a cavity in that side. Feeding means feed into that cavity a mixture of powdered iron ore and reducing agent.

The furnace is operated as a DC arc furnace with the arc maintained between the arcing electrode and the coke column and burning in the cavity, coke descending as needed.

The advantages are that the coke column extending high above the reaction zone filters the reaction gases, rising through the column, free from contaminants, while the coke column protects the furnace shaft lining and the hearth lining from the arc flare.

As a DC arc furnace the contact means is an anode and the arcing electrode is a cathode because this provides a smoother burning arc and reduced arcing electrode consumption, the arcing electrode being either graphite or Soderberg.

Metal oxides other than iron ore can be reduced in the furnace.

DESCRIPTION OF THE DRAWING

The accompanying drawing is for use in connection with the following detailed description of the invention, and by a vertical section view shows the presently preferred form of the furnace.

DETAILED DESCRIPTION OF THE INVENTION

The illustrated furnace is a shaft furnace having a hearth 1 and a shaft 2 extending upwardly from the hearth and adapted to contain a coke column 3 above the hearth 1. Preferably the shaft is in the form of two truncated cones placed base to base with the lower conical portion having its frustrun joining with the frustrun of a conical bosh the base of which forms a hearth 1. This reduces the pressure the bottom of the coke column exerts on the hearth 1. The coke is in the familiar particulated or granular form and the column is completely enclosed by the furnace.

At the junction between the longer upper and shorter lower frusto conical parts of the furnace, above the bosh, a metal flat or cylindrical ring 4 is built in the furnace side wall, and which, although not shown, is preferably watercooled. Further downward in the bosh section of the furnace an electric arcing electrode 5 extends transversely through the furnace side wall via a hole 6 having an inside diameter substantially larger than the outside diameter of the electrode 5. The ring 4 provides electrical contact with the coke column 3 and is shown connected with the positive side of a DC source having its negative side connected with the arcing electrode 5. This permits the electrode 5 to strike an arc with the adjacent side of the coke column 3 and form a cavity 7 in this side. With adequate DC power the arc locally within the cavity can provide temperatures of from 5,000° to 7,000° C. The arrangement is entirely practical. The arc is indicated at 7a and for maximum heating intensity it should in effect drive directly into the coke column in axial alignment wih the arcing electrode.

An annular nozzle 8 surrounds the arcing electrode and has an annular orifice facing inwardly through the bosh opening 6 and forwardly towards the tip of the electrode 5 so as to define an injection path or sheath surrounding the arc 7a. This annular nozzle 8 is fed from pipes 8a with high velocity fluid streams of gas carrying the particulated and normally partly pre-reduced iron ore to be finally reduced. With this iron ore is also fed a carbonacous reducing agent which would normally be a hydrocarbon oil, pulvarized coal, etc. Slag formers can be included.

The fed material forms a sheath around the arc reducing or eliminating any tendency of the arc to be formed between the side of the arcing electrode and the surrounding coke. As a further precaution an annular electromagnet 9 is built in the bosh wall so as to surround the opening 6, and which when electrically powered creates a field controlling the direction of the arc 7.

The bosh or hearth portion of the furnace has a cinder notch 10 and an iron notch 11 positioned appropriately to perform their usual functions.

The furnace is a complete enclosure except for having a gas outlet 12 and a rotary valve type feeder 13 for maintaining the height of the coke bed without permitting gas escape.

In operation the arc 7a heats the feeding fluid flow surrounding it. Arc temperature can be from 5,000° to 7,000° C. and possibly higher, burning the cavity 6. The reducing components carried by the flow reduce the also carried iron ore almost immediately. The reducing reaction is endothermic and the temperature rapidly drops to around 2,000° to 2,500° C. in the surrounding coke. The almost instantaneously formed iron falls through the coke bed below the reaction zone and collects in the hearth 1 from which it is tapped is required via the iron notch 11, slag being removed as required via the cinder notch 10.

The reaction gases being carbon monoxide and hydrogen gas mixtures cannot support combustion of the coke normally and normally the coke is not consumed if the reducing agent is properly proportioned relative to the ore. The coke column should be maintained high enough above the reaction zone to function as a filter for the reaction gases rising from the reaction zone or cavity in the coke column, before the gas is discharged through the gas outlet 12. Therefore, the tars and other contaminants resulting from the use of reducing agents such as liquid hydrocarbon or coal are filtered from the rising reaction gases. The filtering is both mechanical and by condensation of any liquid particles on the coke particles. Therefore, a pure combustible gas mixture is discharged from the gas outlet 12 at a temperature of from 1,300° to 1,500° C. This discharged gas, is suitable for use directly at its high temperature as a medium for partially reducing the iron ore to be fed into the furnace for complete reduction. If this discharged gas contained contaminants from the carbonacous reducing agents fed into the furnace, it could not be used for this purpose because by the recycling action there would be a continuous increase in the amount of the contaminants.

The reducing action is mainly by the reducing agent fed with the ore. The coke column not only filters the reaction gases but also shields the shaft's lining and the anode ring from the arc flare.

What is claimed is:

1. A metal oxide reduction furnace having a hearth, a shaft extending upwardly from the hearth and adapted to contain a coke column above the hearth, contact means for connecting electric power to the coke column, an electric arcing electrode extending transversely through a side of the shaft and adapted to be connected with the power so as to form an arc with a side of the coke column and burn a cavity therein, said furnace being adapted to operate as a DC arc furnace and in which said contact means is an anode vertically offset from the arcing electrode so as to be controlled by the coke column and the arcing electrode is a cathode, the shaft's said side having a hole through which the arcing electrode extends and the hole forming an annular space around the electrode, feeding means for feeding into the cavity in particulate form the metal oxide to be reduced together with a reducing agent, said feeding means being an annular nozzle pointing through the annular space towards the arcing electrode's tip and surrounding the arcing electrode and adapted to be fed with the metal oxide and reducing agent carried by a pressurized gas flow so as to form an annular flow surrounding the arcing electrode's tip and the arc it forms with the coke column.

2. The furnace of claim 1 in which the shaft and hearth form a pressure-containment and the shaft's top has a gas outlet above the coke column.

3. The furnace of claim 1 in which the anode is formed by a metal ring on the shaft's wall at a height above the arcing electrode to cause the portion of the coke column between the anode and arcing electrode to function as an arc flare shield for the anode.

4. The furnace of claim 1 in which an electromagnetic coil surrounds the shaft's said hole and is adapted to be electrically energized so as to provide a magnetic field surrounding the arc.

* * * * *